United States Patent
Mitchell et al.

(10) Patent No.: US 12,034,799 B2
(45) Date of Patent: *Jul. 9, 2024

(54) SYSTEMS AND METHODS FOR AUTOMATED, CONTROLLERLESS AND STATELESS NETWORK CONNECTION SELECTION BASED ON DISTRIBUTED SERVER INFORMATION

(71) Applicant: IP Technology Labs, LLC, Blatimore, MD (US)

(72) Inventors: Gary Mitchell, Owings Mills, MD (US); Scott Whittle, Olney, MD (US); Kurt Quasebarth, Baltimore, MD (US)

(73) Assignee: IP Technology Labs, LLC, Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,894

(22) Filed: Sep. 12, 2022

(65) Prior Publication Data
US 2023/0007091 A1 Jan. 5, 2023

Related U.S. Application Data

(63) Continuation-in-part of application No. 17/183,953, filed on Feb. 24, 2021, now Pat. No. 11,477,276.

(51) Int. Cl.
*H04L 67/1008* (2022.01)
*H04L 47/125* (2022.01)

(52) U.S. Cl.
CPC ........ *H04L 67/1008* (2013.01); *H04L 47/125* (2013.01)

(58) Field of Classification Search
CPC ..... H04L 67/01; H04L 67/101; H04L 47/125; H04L 67/1008
See application file for complete search history.

(56) References Cited

U.S. PATENT DOCUMENTS

| | | | |
|---|---|---|---|
| 6,078,960 A * | 6/2000 | Ballard | H04L 67/1019 709/239 |
| 6,175,869 B1 | 1/2001 | Ahuja et al. | |
| 6,950,849 B1 * | 9/2005 | Brandstatter | G06F 9/505 709/227 |
| 6,950,948 B2 | 9/2005 | Brandstatter | |

(Continued)

*Primary Examiner* — Johnny B Aguiar
(74) *Attorney, Agent, or Firm* — Offit Kurman, P.A.; Joseph P. Mathew

(57) ABSTRACT

The invention is that of systems and methods for controllerless and distributed network connections to servers on a network by remote clients seeking their services. The invention comprises a central database where servers within a server group identified by a group name may post unique identifiers (UIDs) for retrieval by group clients configured with the group name, which may query the central database for server connection information such as uptime, downtime, and congestion in order to select a server for a preferential connection based on an overall availability profile as determined by the group client. In some embodiments, one server of the group is a "dummy server" that may aggregate and selectively transmit server information from other servers in the group, or other devices, and posts it to the central database for client access. The methods described herein eliminate a separate controller and thereby a single point of failure (SPOF).

18 Claims, 1 Drawing Sheet

(56) References Cited

U.S. PATENT DOCUMENTS

| | | | |
|---|---|---|---|
| 2001/0039585 A1* | 11/2001 | Primak | H04L 67/1001 709/224 |
| 2007/0260676 A1* | 11/2007 | Bozinovski | G06F 11/3495 714/E11.202 |
| 2008/0172451 A1* | 7/2008 | Kim | H04N 21/47202 709/203 |
| 2022/0272147 A1 | 8/2022 | Mitchell et al. | |
| 2023/0104116 A1* | 4/2023 | Nosalis | H04L 67/1004 726/15 |

* cited by examiner

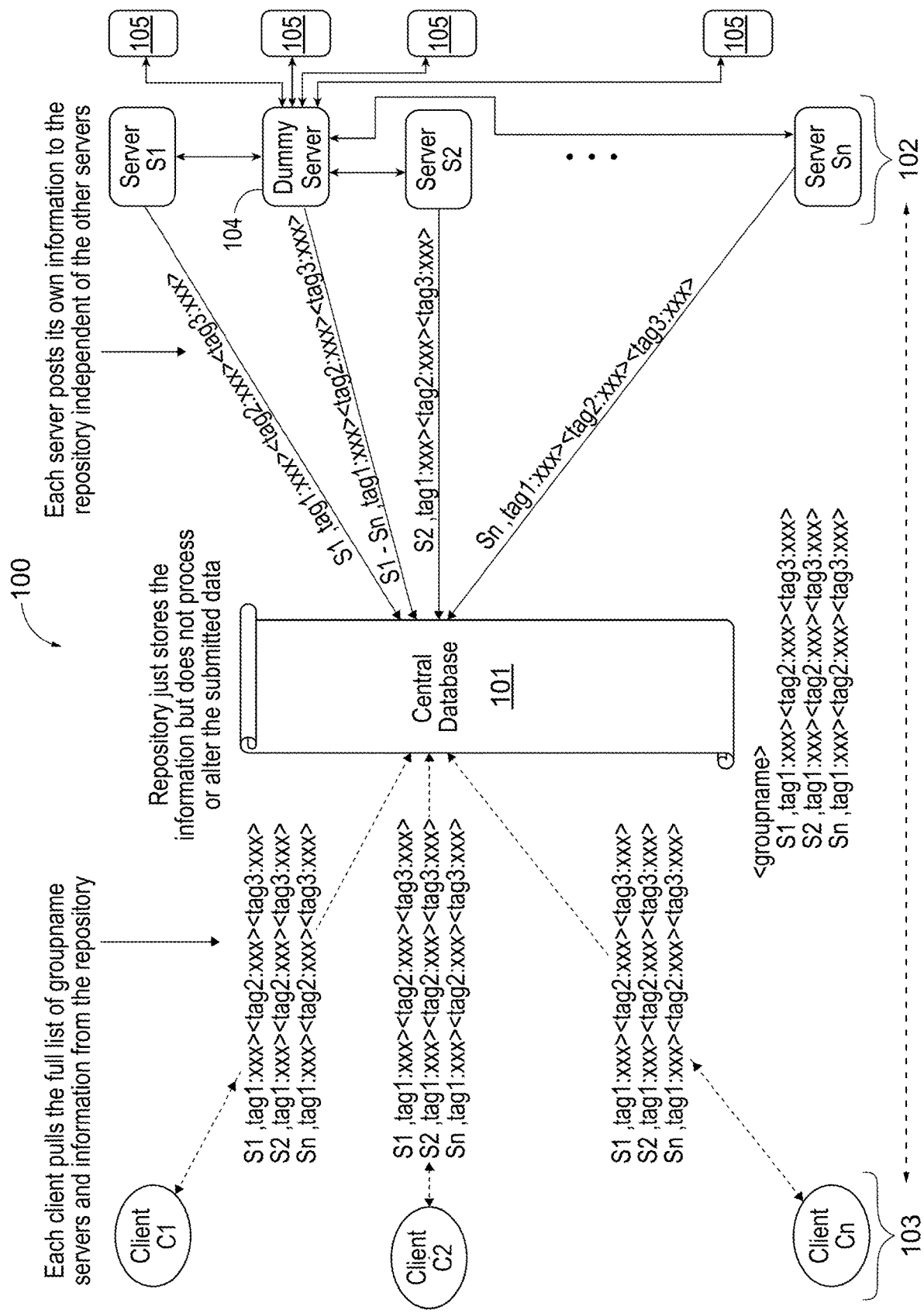

SYSTEMS AND METHODS FOR AUTOMATED, CONTROLLERLESS AND STATELESS NETWORK CONNECTION SELECTION BASED ON DISTRIBUTED SERVER INFORMATION

CROSS-REFERENCE TO RELATED APPLICATIONS

This application is a continuation-in-part of U.S. patent application Ser. No. 17/183,953, filed Feb. 24, 2021, the contents of which are hereby incorporated by reference in their entirety.

STATEMENT REGARDING FEDERALLY SPONSORED RESEARCH OR DEVELOPMENT

The invention described in the present application was conceived and reduced to practice without the benefit of federal funding.

BACKGROUND OF THE INVENTION

The invention is that of systems and methods for controllerless and distributed network connection reachability, including optimized load balancing and connection traffic engineering leading to high-availability (HA) connection applications on a network.

Current technologies and implementations are based on centrally and collocated services that aim to make a set of servers or services appear as one. Load balancers direct inbound connections to a plurality of backend servers, wherein a load balancer acts as a network traffic controller.

For HA redundancy, state of the art technology involves the assignment of one or more servers into a group, and then virtualizing which server and network interfaces are presented to the wider network. If a server in the group goes down, then another is reconfigured with the virtualization information and takes over. They are grouped together as a physical unit and will present a single service to the network as if from a single server. There is no ability to have various servers operating in different physical and logical locations.

Additionally, a remote application attempting to connect with a server in the group has no information about the server status (e.g., uptime, downtime, impaired, sunset, etc.) and how it might establish a connection to that application (e.g., User Datagram Protocol (UDP), Transmission Control Protocol (TCP) over cellular Port A, Port B, etc.). It would be desirable for a remote application to be equipped with this information so that can intelligently direct where it should connect, when and how.

For example, it may be desirable to perform maintenance on a server, but also desirable to not to disconnect all existing connections but rather wait until they naturally disconnect (e.g., sunset). In that case, it would be beneficial to alert clients that no new connections are available to the server targeted for maintenance, but if a client is connected, to stay connected. Similarly, it may be beneficial to indicate whether traffic to a particular server is congested, in which case a remote application may connect to another server with less congestion based on its needs.

In view of current methods, there is an explicit market need in the art for a method for a logical group of network applications (e.g., servers) to publish information about the reachability of those applications as well as details about how to associate or communicate with them, such as in a database visible to remote clients. Without using an intermediate controller or director, the methods described herein meet this need by distributing all of the available servers and the information contained on each asynchronously, so each individual remote application has full visibility of the list of servers within a group and can use that visible server information to establish connections in the most efficient manner possible.

BRIEF SUMMARY OF THE INVENTION

The invention of the present disclosure involves the configuring of each of a plurality of applications ("servers") with a group name and posting of a unique identifier (UID) for each server to a central database with the group name, along with various status and connection details. In certain embodiments, a "dummy server" with a UID is configured with the same group name as the plurality of servers and compiles aggregated server connection information comprising the UIDs, server connection information for the plurality of servers configured with the group name, and extrinsic connection information for posting to the central database. Extrinsic server connection information may be obtained from devices outside the server group, and may include information such as geolocation information, meta data, power supply information, temperature information, security information, maintenance information, time of day, environmental quality and bandwidth load. Remote applications ("clients") will be configured with the group name only instead of individual server addresses. A client will query the central database and obtain a list of one or more of all the servers in the server group, including the dummy server, that have posted a UID as well as their status and connection details, or in the case of the dummy server, the status and connection details of the other servers in the group, along with extrinsic connection information. Clients will analyze this list and individually make connections based on the client's desired configuration.

It is important to note that the central database does not perform any modification or adjudication of any server's postings, including the dummy server (i.e., the system is controllerless). The database simply receives database entries and updates or provides information for any inquires for a group name. Additionally, all clients configured with a group name will have full visibility to the available resources within that group, and overall reliability is increased as there isn't a central controller as a single point of failure (SPOF) for connecting and obtaining services. Another benefit is that servers in a group do not have to be collocated or grouped together physically or configured as a closed cluster using older redundancy technologies. This and other benefits of the invention of the present disclosure will become evident to one of ordinary skill in the art in view of the disclosure that follows and accompanying drawings and claims.

BRIEF DESCRIPTION OF THE DRAWINGS

FIG. 1 is a high-level diagram showing the relationship between clients, servers and a database of server information for a given group named as described herein.

DETAILED DESCRIPTION OF THE INVENTION

The invention is that of systems and methods for controllerless and distributed network connection reachability, including optimized load balancing and connection traffic engineering leading to HA connection profiles on a network. A system according to the present disclosure allows for the configuration of remote clients with a group name for a corresponding group of servers, including a dummy server that aggregates server information of other servers in the group, along with extrinsic connection information, for posting, and a central database containing information on each server within the group, which a client may access in order to direct connection behavior and obtain services more readily based on data traffic congestion levels and other factors affecting connectivity.

In certain embodiments, the invention provides methods for a logical group of servers to publish information about their reachability as well as details about how to associate or communicate with them in a central database corresponding to the group and available to remote clients. A method according to the present invention comprises distribution of all of the available servers and their information asynchronously, so an individual client has full visibility to a list of servers within a group and can direct data traffic to a server with the most suitable connection attributes.

The invention of the present disclosure enables clients to identify suitable connections without prior connection or communication with any server in a group, and without a controller, enables a group of resources to be located physically or logically anywhere in a network and pushes group resource information to all associated remote applications for local decision processing. This eliminates the presence of an SPOF for obtaining services and reduces the possibility of service interruption by housing servers at different physical locations.

A typical application according to a system of the present disclosure would be a collection of servers organized as an administrative unit, identified by a group name, and comprising a dummy server that aggregates server information from other servers in the group. One or more clients may need to connect to one or more of the servers. For load balancing, HA, traffic engineering, or maintenance operations, it is desirable to signal to the clients which server or servers are available and details on the status of each.

It is one object of the invention of the present disclosure to overcome the need for a separate controller to manage load balancing, availability, or traffic engineering. A separate controller is an added expense, another item that must be maintained, and is another possible point-of-failure in the network. It is an object of the present invention to remove the risk associated with a SPOF in favor of multiple distributed connection points.

It is another object of the invention to overcome the need for a headend group of resources to be physically grouped together. Solutions that are currently available require similar devices identified as a group to be collocated with each other. These implementations group a set of appliances together and present a monolithic service to the network. For example, Virtual Router Redundancy Protocols (VRRPs) as are presently known in the art are typically implemented by presenting a group of routers that are physically connected, such as via local Ethernet connections, as a monolithic processing unit, wherein traffic to the primary network device fails over to another associated network device when connectivity to the primary appliance fails.

It is another object of the present invention to overcome the monolithic server approach by distributing server status and connectivity information to endpoints that initiate connections. With the present invention, remote applications can choose selected resources according to the appropriate connection protocols and service availability, and the general status information of the servers housing those services.

A system according to the invention of the present disclosure may include applications that are in a server posture (i.e., waiting for an inbound connection); applications that are in a client posture (i.e., positioned to make an outbound connection to a server); and a central database (repository) wherein a server group is organized by a group name and populated with server UID information and one or more information fields that include details about each server in the group.

In certain embodiments, a server that should be put into a group will be configured with the appropriate group name according to a method of the present invention. The server will then asynchronously update the group name, as contained in the database, with its UID (such as its media access control (MAC) address, for example) and various details about its status, connection profile, or any other information deemed necessary for remote applications to target the server as a connection. The server will only update its own information and for purposes of updating the central database and client connections, and is generally independent of other servers having its same group name. Each update will have a timestamp to indicate its freshness, and thus if a server fails and does not update its entry, it will be evident that this server is stale and not preferred as other servers will have newer timestamps. As a frame of reference, a server can be considered stale if it doesn't update with a defined period of time, e.g., 60 seconds.

When a remote application or client wishes to connect to a specified server, it will query the central database and receive a list of servers and their associated details. It is important to note that this is done without direct communication to the servers or an intermediate controller. The client can then scan the entire list and make a connection to a server based on its requirements.

An illustrative embodiment of a system according to the present disclosure 100 is shown in FIG. 1. At the center of the system is a central database 101 containing a UID for each server within a server group 102 comprising a plurality of servers (S1-Sn), and a dummy server 104, as well as status and connection details, for example. As explained in the figure, each of the plurality of servers S1-Sn posts its own information to the central database 101 independently of the other servers in the server group 102. Alternatively, each server S1-Sn may communicate its server information to the dummy server 104, which in turn posts it to the central database. The dummy server 104 may also interact with each of the plurality of servers S1-Sn in order to obtain extrinsic connection information, such as temperature and local environmental conditions. A dummy server 104 may be any device equipped with an aggregation module, such as a server, client, or other device so equipped. A dummy server may be programmed to aggregate server information received from the plurality of servers S1-Sn or management monitoring software may be employed to cause the dummy server to aggregate it remotely.

Group clients 103 C1-Cn are each configured with the group name of the server group 102 and can use the group name to query the central database 101 to determine the availability of each server and information relevant to its status, freshness, etc. The central database 101 does not process or alter any information from servers in the server group 102, but the servers may update the posted information at desired intervals, enabling dynamic assessment by group clients 103 of servers in the server group 102 to further enable optimal connections and network utilization.

In certain embodiments, the dummy server 104 may establish bidirectional communications with the plurality of other servers S1-Sn in the server group 102 in order to ensure presentation of the various server connection information to the central database, such as extrinsic connection information selected from a group consisting of geolocation information, meta data, power supply information, temperature information, security information, maintenance information, time of day, environmental quality and bandwidth load. The extrinsic connection information may also be obtained from devices 105 outside the server group 102 but in network communication with the dummy server 104. The extrinsic connection information may be useful to clients for determining their preferential server connections, such as meta data indicating that certain servers within the group should only handle certain types of connections.

As discussed above, it is an object of the invention of the present disclosure to enable distributed HA reachability of network services by group clients C1-Cn without making use of a stand-alone controller as is common among state-of-the-art solutions that require configuration, maintenance, replacement, and the like that can lead to reduced availability of network resources and added costs. It is a further object of the invention of the present disclosure to eliminate the requirement of physical collocation of network applications such as servers that is attendant to current solutions, thereby leading to a more dynamic and asynchronous approach to making distributed services available to group clients 103 of a server group 102 as illustrated in FIG. 1.

These and other embodiments of the systems and methods described and illustrated herein will be understood by one of ordinary skill in the art, the illustrations contained herein representing illustrative embodiments of the invention and not limitations on implementations of the systems and methods as described herein.

Explained another way, the invention of the present disclosure comprises a system for controllerless and distributed network connection reachability, the system comprising a server group, each server in the server group, including a dummy server, having a unique identifier (UID) and a server software module tangibly stored on a nontransitory computer readable medium comprising instructions which when executed by a processor cause the processor to post the UID and server connection information for the plurality of servers (S1-Sn) to a central database 101 or transmit it to the dummy server 104 for posting to the central database 101; a central database 101 comprising a UID and server connection information for each of the plurality of servers of the server group 102; and one or more group clients, each group client configured with the group name for the server group 102 and a client software module comprising instructions which when executed by a processor cause the processor to acquire the server connection information. The server connection information may be selected, for example, from the group consisting of status information, uptime, downtime, impaired, congestion and sunset. In certain embodiments, the group client establishes a preferential connection with a server in the server group based on the server connection information.

A UID according to the present disclosure may be selected from the group consisting of a media access control (MAC) address, an X.509 certificate, a common name, an extension, a hash code, an action request, a source Internet Protocol (IP) address, a source port identifier, a source protocol and combinations thereof.

A system according to the present disclosure may enable a method for establishing a controllerless connection to a server in a server group comprising the steps of configuring one or more clients with the group name for the server group and causing a connected microprocessor to acquire the connection information of selected servers within the server group for connection selection by the one or more clients from a central database by executing instructions of a client software module of a client configured with the group name, wherein each server in the server group is configured with a UID, such as but not limited to a UID selected from the group consisting of a MAC address, an X.509 certificate, a common name, an extension, a hash code, an action request, a source IP address, a source port identifier, and a source protocol. In certain embodiments, the connection information is selected from the group consisting of status information, uptime, downtime, impaired, congestion and sunset.

In certain embodiments, a method according to the present disclosure may further comprise a step of causing a connected microprocessor to establish a connection with the server by executing instructions of the client software module.

These and other embodiments are presented as examples and not limitation of the capabilities enabled by the present invention. One of ordinary skill in the art will appreciate the need in the art for improvements in network reachability that are not reliant on controllers, such reliance being well understood in the current state of the art.

What is claimed is:

1. A system for automated, controllerless and stateless network connection selection, the system comprising:
　a central database in direct network communication with a plurality of servers in a server group and a plurality of clients in a client group, wherein each server of the plurality of servers comprises a unique identifier;
　wherein the server group further comprises dummy server having a unique identifier and an aggregation module tangibly stored on a nontransitory computer readable medium, comprising instructions which when executed by a first processor cause the first processor to compile aggregated server connection information comprising the unique identifier, the server connection information for each of the plurality of servers and extrinsic connection information, and transmit the aggregated server connection information to the central database;
　a server software module tangibly stored on a nontransitory computer readable medium comprising instructions which when executed by the first processor cause the first processor to:
　　transmit the server connection information for each of the plurality of servers to the central database without any modification or adjudication; and
　　selectively transmit the aggregated server connection information to the central database;
　wherein each client of the plurality of clients in the client group is configured with a group name for the server group; and
　a client software module comprising instructions which when executed by a second processor cause the second processor to acquire the server connection information for each of the plurality of servers and the aggregated server connection information;
　wherein the server connection information enables each client of the plurality of clients to establish a preferential direct connection with a server in the server group;
　wherein the central database does not reside on any server of the server group, and does not perform any modification or adjudication on the server connection information for each of the plurality of servers or the aggregated server connection information; and wherein neither the server connection information for each of the plurality of servers nor the aggregated server connection information is modified or adjudicated by any intermediate device in a communication path between any client of the plurality of clients or any server of the plurality of servers, or the dummy server, and the central database.

2. The system of claim 1, wherein the extrinsic connection information is selected from a group consisting of geolocation information, meta data, power supply information, temperature information, security information, maintenance information, time of day, environmental quality and bandwidth load.

3. The system of claim 1, wherein the unique identifier is selected from a group consisting of a media access control (MAC) address, an X.509 certificate, a common name, an extension, a hash code, an action request, a source Internet Protocol (IP) address, a source port identifier, a source protocol and combinations thereof.

4. The system of claim 2, wherein the unique identifier is selected from a group consisting of a media access control (MAC) address, an X.509 certificate, a common name, an extension, a hash code, an action request, a source Internet Protocol (IP) address, a source port identifier, a source protocol and combinations thereof.

5. The system of claim 1, wherein the server connection information for the plurality of servers is selected from a group consisting of status information, uptime, downtime, impaired, congestion and sunset.

6. The system of claim 2, wherein the server connection information for the plurality of servers is selected from a group consisting of status information, uptime, downtime, impaired, congestion and sunset.

7. The system of claim 1, wherein the aggregation module is manually programmed to compile the aggregated server connection information.

8. The system of claim 2, wherein the aggregation module is manually programmed to compile the aggregated server connection information.

9. The system of claim 1, wherein the aggregation module is programmed remotely via management monitoring software to compile the aggregated server connection information.

10. The system of claim 2, wherein the aggregation module is programmed remotely via management monitoring software to compile the aggregated server connection information.

11. A method for establishing a controllerless connection to a server of a plurality of servers in a server group, the method comprising:

configuring a plurality of clients of a client group with a group name for the server group; and causing a first processor to execute instructions of a client software module of a client configured with the group name, which when executed by the first processor cause the first processor to acquire unmodified and unadjudicated server connection information of one or more selected servers of the plurality of servers for preferential direct connection selection by the client from a central database;

wherein each server of the plurality of servers is configured with a unique identifier;

wherein one of the server group comprises dummy server comprising an aggregation module tangibly stored on a nontransitory computer readable medium, comprising instructions which when executed by a second processor cause the second processor to compile aggregated server connection information comprising the unique identifier, server connection information for the plurality of servers and extrinsic server connection information and transmit the aggregated server connection information to the central database;

the central database does not reside on any server of the server group and does not perform any modification or adjudication of the server connection information for the plurality of servers or aggregated server connection information; and wherein neither the server connection information for the plurality of servers nor the aggregated server information is modified or adjudicated by any intermediate device in a communication path between any client of the plurality of clients or any server of the server group and the central database.

12. The method of claim 11, wherein the extrinsic connection information is selected from a group consisting of geolocation information, meta data, power supply information, temperature information, security information, maintenance information, time of day, environmental quality and bandwidth load.

13. The method of claim 11, wherein the unique identifier is selected from a group consisting of a media access control (MAC) address, an X.509 certificate, a common name, an extension, a hash code, an action request, a source Internet Protocol (IP) address, a source port identifier, and a source protocol.

14. The method of claim 12, wherein the unique identifier is selected from a group consisting of a media access control (MAC) address, an X.509 certificate, a common name, an extension, a hash code, an action request, a source Internet Protocol (IP) address, a source port identifier, and a source protocol.

15. The method of claim 11, wherein the server connection information for the plurality of servers is selected from a group consisting of status information, uptime, downtime, impaired, congestion and sunset.

16. The method of claim 12, wherein the server connection information for the plurality of servers is selected from a group consisting of status information, uptime, downtime, impaired, congestion and sunset.

17. The method of claim 11, further comprising the step of causing the first processor to establish a connection with the server of the plurality of servers by executing instructions of the client software module.

18. The method of claim 12, further comprising the step of causing the first processor to establish a connection with the server of the plurality of servers by executing instructions of the client software module.

* * * * *